United States Patent
Hassan et al.

(10) Patent No.: US 10,922,436 B2
(45) Date of Patent: Feb. 16, 2021

(54) SECURING SENSITIVE DATA USING DISTANCE-PRESERVING TRANSFORMATIONS

(71) Applicant: Microsoft Technology Licensing, LLC, Redmond, WA (US)

(72) Inventors: Amer A. Hassan, Kirkland, WA (US); Edward C. Giaimo, III, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 206 days.

(21) Appl. No.: 16/057,444

(22) Filed: Aug. 7, 2018

(65) Prior Publication Data
US 2020/0050794 A1    Feb. 13, 2020

(51) Int. Cl.
| G06F 21/00 | (2013.01) |
| G06F 21/62 | (2013.01) |
| G06F 21/32 | (2013.01) |
| G06F 21/60 | (2013.01) |
| H04L 29/06 | (2006.01) |

(52) U.S. Cl.
CPC .......... *G06F 21/6254* (2013.01); *G06F 21/32* (2013.01); *G06F 21/602* (2013.01); *G06F 21/604* (2013.01); *H04L 63/102* (2013.01)

(58) Field of Classification Search
CPC .. G06F 21/6254; G06F 21/604; G06F 21/602; G06F 21/32; H04L 63/102; H04L 63/0861; H04L 63/08
See application file for complete search history.

(56) References Cited

U.S. PATENT DOCUMENTS

| 2009/0022374 A1* | 1/2009 | Boult .................. G06K 9/6215 382/119 |
| 2011/0037563 A1* | 2/2011 | Choi ...................... G06F 21/83 340/5.83 |
| 2015/0186721 A1* | 7/2015 | Derakhshani ....... G06F 21/6254 382/117 |
| 2017/0005794 A1 | 1/2017 | Paddon et al. |

OTHER PUBLICATIONS

"International Search Report and Written Opinion Issued in PCT Application No. PCT/US19/038821", dated Sep. 20, 2019, 10 Pages.

Yang, et al., "Non-invertible geometrical transformation for fingerprint minutiae template protection", In Proceedings of the 1st International Workshop on Security and Communication Networks, May 20, 2009, 7 Pages.

Thakkar, Danny, "What is a biometric template? Is it secure?", Retrieved from: https://www.bayometric.com/biometric-template-security/, Retrieved Date: Aug. 22, 2018, 9 Pages.

\* cited by examiner

*Primary Examiner* — Mahfuzar Rahman
(74) *Attorney, Agent, or Firm* — Schwegman Lundberg & Woessner, P.A.

(57) ABSTRACT

Disclosed in some examples are methods, systems, devices, and machine-readable mediums for securing biometric data using distance-preserving transformations. A distance-preserving transformation is a function which maps elements to the same or another metric space such that the distance between the elements in the new metric space is equal to the distance between the elements in the original metric space.

20 Claims, 5 Drawing Sheets

SECURING SENSITIVE DATA USING DISTANCE-PRESERVING TRANSFORMATIONS

BACKGROUND

Current methods of authenticating users on computer systems typically rely upon a username and password and in some instances a one-time code. These methods have a number of disadvantages. For example, the strongest passwords are those that have random characters rather than words or phrases. However, these random passwords are difficult to remember, so users often chose passwords with words or phrases that are vulnerable to dictionary attacks. In a dictionary attack, the attackers try various combinations of common words and phrases from a list of common words and phrases called a dictionary. Additionally, so-called two factor authentication safeguards that require use of a one-time code sent to a second trusted computing device (such as a smartphone) are also vulnerable. For example, cellular telephone providers have been tricked into providing a malicious individual with access to the legitimate individual's text messages.

Biometrics are measurable characteristics of a person that are capable of identifying that person within a particular level of uniqueness. As the level of uniqueness for several common biometrics is particularly high, biometrics are particularly well suited for authenticating a user. For example, it is believed that fingerprints are unique to each individual and may serve as a very accurate indicator that the person is who they say they are. Example biometrics with high levels of uniqueness include fingerprints, iris structure, retina structure, DNA composition, facial data (e.g., feature distances), voice prints, ear structure, and the like.

To utilize biometrics to authenticate a user, the user first sets up biometric authentication by presenting a sample of their biometric to a computing device for capture or scanning. For example, by pressing a finger on a fingerprint sensor, by allowing a picture of an iris, a retinal scanning, or a facial scan. This biometric data is captured and sampled into a set of one or more data points called a biometric template. A biometric template is a digital representation of one or more features extracted from the scanned biometric data. For example, locations of ridges and valleys in a fingerprint. Once this initial template is stored, the user is configured to authenticate with their biometrics. This initial saved biometric template may be called an exemplar biometric template as it is used as an exemplar—a ground truth biometric that identifies a user and to which biometric templates submitted during subsequent authentication attempts are compared. When a person attempts to authenticate a device using biometrics, the person presents their biometric to the computing device for capture or scanning. This biometric data is captured and sampled into one or more data points and stored as a "challenge template." The challenge template is compared to the exemplar template and if they match, the user is authenticated and granted access to one or more computer resources secured by the biometric data. If the templates do not match, the user is not authenticated and may be denied access to one or more computerized resources.

In contrast to username and passwords, biometrics do not require memorization of a password and so they cannot be forgotten. Moreover, biometrics are difficult to fake. For example, it would be difficult for a malicious actor to: 1.) obtain a retina scan of an individual and 2.) reproduce that retina scan in front of retina scanner. Biometrics are thus an enticing option for application developers who are interested in a secure authentication method.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
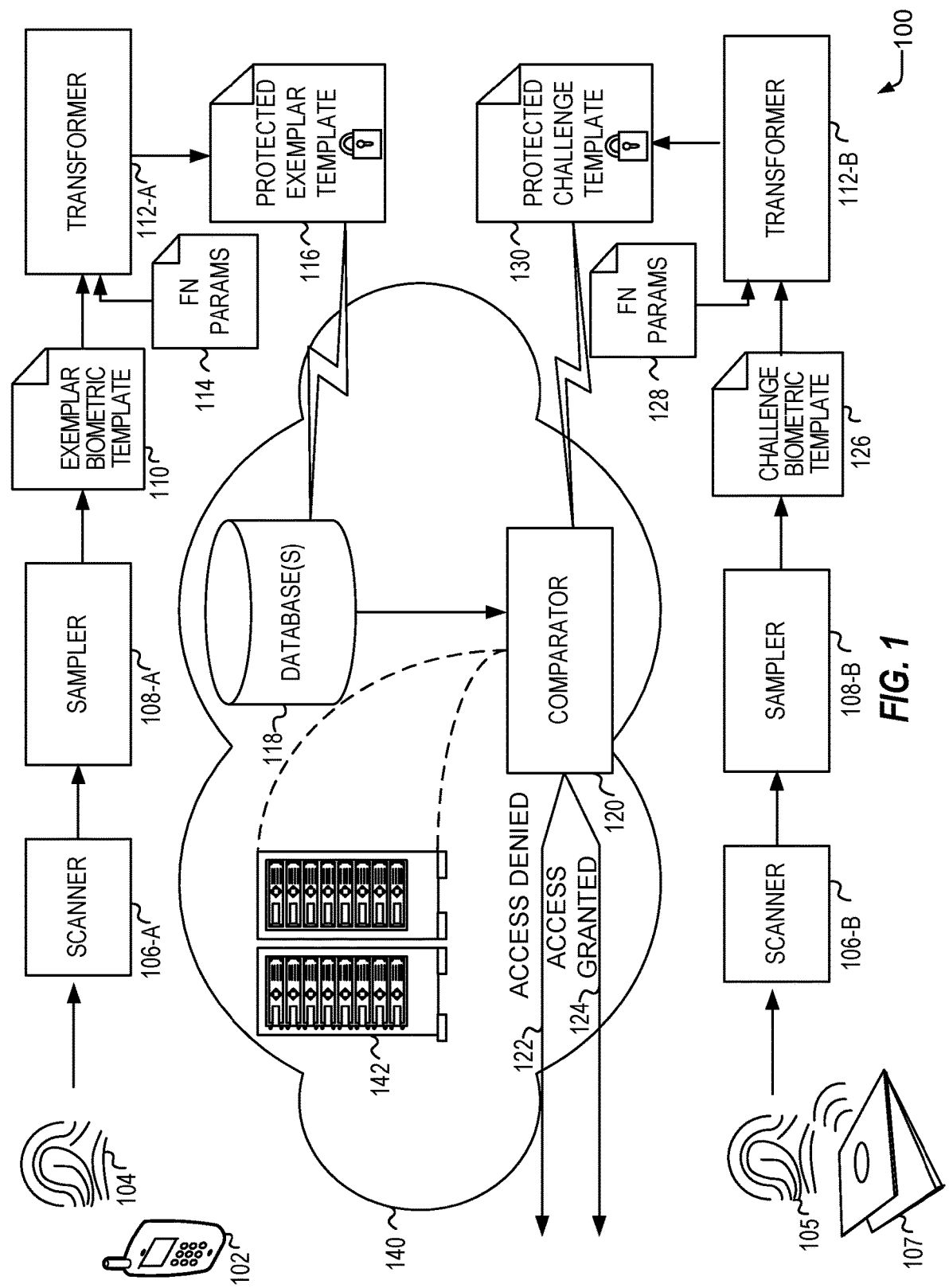
FIG. 1 illustrates a schematic data flow of a biometric system according to some examples of the present disclosure.

Despite the benefits of biometric authentication, the use of biometrics has also introduced some drawbacks. For example, as previously described, biometric authentication requires users to register their biometric data provide an exemplar biometric). If a user has multiple devices and/or accounts that they wish to authenticate with using biometrics, they typically need to register by providing a biometric exemplar for each of these devices and accounts. This registration time is often annoying for the user. Moreover, in the case of some biometrics such as fingerprints, the user must remember which fingerprint they submitted to each device as the exemplar. This may cause user confusion when trying to subsequently authenticate. To eliminate these issues, the exemplar biometric data may be stored in a network-based (e.g., cloud based) server that would then be communicatively coupled to the user's devices. When a user wishes to authenticate with one of their devices, the challenge biometric is then sent to the network-based server which determines whether the user is authenticated by comparing the challenge template to the exemplar template. This allows for a single registration procedure across all of the user's devices.

Regardless of where the biometric exemplar is stored (within each device or in a network-based server), secure biometric storage is important since, in contrast to passwords, biometric data cannot be changed if the user's data is stolen. By moving biometric templates to the cloud, the authentication service becomes an enticing target for hackers. One way of securing this data is to use encryption. For example, encryption may include transforming the biometric template using an encryption function $e(x,k)$ from a first form to an encrypted form, where x is the biometric template, and k is a secret key. An attacker that is able to access the stored encrypted biometric data may not be able to leverage this data without knowing the key used to decrypt the biometric template.

Unlike a password where the user either knows the password or not, a series of scans of the same fingerprint, iris, face, etc. . . . may produce slightly different biometric data due to the accuracy of the scanner, positional differences of the user, ambient light differences, and the like. Because biometrics typically rely upon the locations of (or differences in locations of) various detected features (e.g., ridges or swirls on a fingerprint, facial features . . . ) and because the encryption algorithm scrambles the biometric data (scrambling these locations and/or distances), two very close biometric templates that are both encrypted by the same key may be very different. To handle these differences, the biometric templates may be compared when decrypted. Thus, the encrypted exemplar is decrypted during an authentication attempt by using the key to produce the original exemplar which is then compared with the challenge template. This allows a direct comparison of the newly scanned biometric with the exemplar. Tolerances for error may then be utilized—e.g., a threshold distance between the measured points on a fingerprint, for example. Nevertheless, in order to decrypt the exemplar biometric template the device performing the authentication must have knowledge of the decryption key and it must be stored which may make the decryption key accessible by attackers. Other types of transformation functions—such as hash functions—suffer from the same problems—that is the transformed value does not retain the important information used to make decisions on authentication (e.g., the location of the points or distances between points) and thus, an inverse of the function must be stored.

In order to avoid using a decryption key or applying an inverse function, and to avoid minor differences between the challenge template and the exemplar template from presenting problems with authentication, the biometric templates may be quantized prior to their transformation or encryption. That is, for a given sampled biometric point (e.g., a point on a fingerprint), the point may be mapped to the next closest point. Another way of thinking of this is that the biometric may be downsampled. Because the odds have increased that the challenge template may be identical to the exemplar template prior to application of the encryption function and/or the transformation function, the probability that the encrypted or transformed template is identical has also increased. This increases the tolerance for minor changes between the biometric as captured for the exemplar and the challenge. By performing this quantization, it may be possible to compare the encrypted exemplar and the encrypted challenge template without decrypting them first. This approach suffers from the drawback that it reduces the accuracy of the biometric in determining identity.

Yet another approach for resolving this is to capture several biometric exemplars. For example, a user's facial recognition exemplar is captured in a variety of lighting conditions and from a variety of angles. All these exemplars are then encrypted or transformed and stored. Upon a subsequent authentication attempt the encrypted challenge template is compared with all the exemplars. If one of them matches, then the user is authenticated. This approach is costly in terms of storage. While a single template may be relatively small in terms of storage necessary, in an authentication service that may store millions of user's biometric exemplar templates, doubling, tripling, or even quadrupling the amount of storage needed adds up quickly. Additionally, the processing time increases as the authentication system needs to check a challenge template against not one, but two or more exemplar templates. If the authentication service is handling a lot of authentications, this additional processing time is not insignificant.

Disclosed in some examples are methods, systems, devices, and machine-readable mediums for securing biometric data using distance-preserving transformations. A distance-preserving transformation is a function which maps elements to the same or another metric space such that the distance between the elements in the new metric space is equal to the distance between the elements in the original metric space. Example distance-preserving functions include translations, rotations, and reflections. Thus, if two points are X distance apart before the transformation, they remain X distance apart after the transformation. For example, if a template has a point (3, 5) and a second point (7,8) the distance is $d=\sqrt{(x_2-x_1)^2+(y_2-y_1)^2}=5$. In a distance-preserving function, any transformed template maintains this distance. For example, if the transformed points are translated to (8, 10) and (12, 13), the distance between them remains 5.

The distance preserving function protects the biometric data by transforming it into a form that is not easily reversible. One advantage of using distance-preserving transformations for biometrics over other transformations is that local distortion on the device a fingerprint smudge or misalignment) translates to similar distortion on the transformed biometric template. The ability to tolerate some ambiguity in biometric data is important as already noted because the process of scanning a biometric has some level of error associated with it. Because the distance-preserving transformation does not alter the relationship of the points within a particular biometric, there is no need to apply a quantization process that reduces biometric accuracy, nor is there a need to apply decryption key prior to comparing the challenge template to the exemplar template.

By utilizing a distance-preserving transformation it becomes possible to compare a single transformed exemplar to a transformed challenge template without decrypting the exemplar or using a plurality of transformed exemplars. The transformed challenge template and the transformed exemplar may be compared and may constitute a match if they are within a predetermined distance of each other. This provides significant improvements in the functioning of the computer system by decreasing the time needed to authenticate a biometric challenge as the computer system does not need to decrypt anything and does not need to check a challenge template against several exemplars. As a single exemplar is stored, less storage is also needed. Furthermore, this makes the disclosed process more secure as keys and inverse functions are not stored nor utilized and so there is no possibility of an attacker gaining access to the biometric.

FIG. 1 illustrates a schematic data flow of a biometric system 100 according to some examples of the present disclosure. During a setup phase, a user may present one or more biometrics 104, such as a fingerprint, iris, face, retina, and the like to computing device 102. Computing device 102 may include one or more biometric scanners 106-A such as a fingerprint reader, iris scanner, retinal scanner, cameras (for facial recognition), and the like. The scanner 106-A may digitize the biometric. For example, for a fingerprint the scanner may read the patterns on the user's finger and convert this into a digital representation of those patterns. Sampler 108-A may convert the digital representation of those patterns to a series of one or more data points. For example, locations of ridges of the fingerprint, distances between facial features (e.g., distances between a nose and mouth) for facial recognition, and the like produce biometric data called a biometric template. In some examples, sampler 108-A may be part of the scanner 106-A. The biometric template produced during the setup phase may be called the exemplar biometric template 110.

Transformer 112-A may transform exemplar biometric template 110 into a protected exemplar template 116 by application of a transformation function, such as a distance-preserving function. The transformer applies the transformation function using one or more transformation function parameters 114. In some examples, to prevent replay attacks in the event that protected exemplar template 116 is stolen, the transformer 112-A may also apply one or more user specific values to modify the exemplar biometric template (e.g., a nonce value). This allows the user to change the protected exemplar template 116 by changing the user specific value if it becomes compromised by re-registering with a new user specific value (which produces a new protected exemplar template 116). In other examples, the function parameters 114 may include user specific values that change the transformation applied based upon a user specific value for the same reason and to produce a same effect namely to prevent replay attacks by changing the protected exemplar template 116.

The protected exemplar template 116 may be stored locally on the computing device 102, or the protected exemplar template 116 may be transferred via a communications network to one or more network-based services, such as an authentication service 140. Authentication service 140 may have one or more server computing devices 142, one or more data storage devices (e.g., database(s)) 118, and the like. The server computing devices 142 may include or implement a comparator 120 (e.g., a hardware or software component of the server computing devices 142). The protected exemplar template 116 may be stored in the database 118 and be associated with an identifier of the user (e.g., username, password, or other credential).

When a user wishes to later authenticate using their biometric, the user can use a same computing device or a different computing device. As shown in FIG. 1, components designated as A and B may be the same component on the same device or different instances of a same component on a different computing device. Shown in FIG. 1 a different computing device 107 in the form of a laptop computing device is utilized. As part of an authentication process, the user presents their biometric 105 (which may be the same biometric as 104) to a scanner 106-B on the computing device 107. The sampler 108-B samples the biometric representation produced by the scanner 106-B in a same or similar process as used by the sampler 108-A. This produces a challenge biometric template 126.

Transformer 112-B utilizes function parameters 128 (which may be the same function parameters as function parameters 114) to apply a same transformation function as applied by transformer 112-A to produce a protected challenge template 130. In examples in which a user-specific value is applied, the user-specific value may also be applied. The generated protected challenge template 130 may be compared to a stored protected exemplar template 116 locally on the computing device (e.g., computing device 102 or 107 may implement comparator 120) or sent via a communications network to the authentication service 140 where it is compared by comparator 120. Comparator 120 may then compare the protected challenge template 130 to the protected exemplar template 116 to output a message or signal 124 granting access if they match, and message or signal 122 denying access if they do not. These messages or signals may be instructions to one or more computing devices, such as user computing devices (e.g., 102, and/or 107), a third-party server or service, or the like that indicate whether the authentication succeeded or failed.

Comparator 120 may require an exact match—that is unless the protected exemplar template matches the protected challenge template exactly, the access denied message 122 is sent. In other examples, the comparator may have a threshold level of error that may be tolerated and access may still be granted.

The function parameters 128 and 114 may be stored on computing devices 102 and 107 or they may be stored on authentication service 140. In examples in which the transformer 112-A and 112-B is implemented on each computing device and function parameters 128, 114 are stored at the network-based authentication service 140, the network-based authentication service 140 may send the function parameters to the computing devices 102, 107 for use in transformers 112-A and 112-B to transform the biometric template into a protected template. In examples in which the function parameters 128 and 114 are stored on each computing device, the network-based authentication service 140 may assist in distributing the function parameters 128, 114 to devices that are setup to use the biometric authentication.

In some examples, the transformer 112-A and 112-B uses one or more distance-preserving functions such as one or more translations, rotations, and reflections. In some examples, the function parameters 128 and 114 may be one or more of: a selection of one or more translations, rotations and reflections, and/or a number, and/or a magnitude of the various transformations. For example, the function parameters 128 and 114 may specify that a translation and a rotation is to be applied, but not a reflection and that the translation has a particular magnitude and the rotation is by a particular specified degree. In addition, the transformation may be a particular sequence of translations, rotations, and reflections for example, the transformation may be a translation of a first magnitude, a rotation of a second degree, and a further translation of a third magnitude.

The function parameters 114, 128 may be randomly determined upon registration, may be determined by the user, an administrator, pre-programmed into the system, or the like. In some examples, the function parameters may be distributed to all the user devices of the user. In some examples, the function parameters may be resident in the authentication service and may be transferred to computing devices 102 and 107 either periodically or as part of the authentication proceeding. In other examples in which the function parameters are resident in the authentication service, the transformer 112-A and 112-B may be implemented in the network-based authentication service.

In other examples, the function parameters may be determined based upon a secret of the user—such as a password; public or private key; or a second biometric. For example, the secret may be input into a selection function to select the functional parameters, which are then used by the transformers 112-A and 112-B to transform the exemplar and challenge templates into the protected templates. In some examples, this method provides benefits in that the functional parameters 114 and 128 are not stored, and therefore there is no need for a method of distributing the function parameters 114. Furthermore, if the protected exemplar template 116 is compromised, the user may change the protected exemplar template 116 by changing the secret and reregistering the exemplar to prevent replay attacks where the attacker injects the protected exemplar template 116 without providing the biometric 104, 105 during authentication.

As a simple example, a user secret in the form of a password may be represented by a series of unicode numbers. These numbers may correspond to a sequence of translations, rotations, and reflections. For example, a password of: "password1234" may translate into the numbers 112, 097, 115, 115, 119, 111, 114, 100, 049, 050, 051, 052. In some examples, this applies a pattern. For example, translate by 112, then rotate by 097 degrees, then reflect (115 mod 2)=1 time, then translate by 115, then rotate by 119 degrees, and so on. In these examples, users may apply their passwords both when registering and when subsequently authenticating.

Scanners 106-A and 106B; samplers 108-A and 108B; transformers 112-A and 112-B; and comparator 120 may be implemented in hardware or software of a computing device, such as computing device 102, 107, or server computing devices 142. While certain functionality is shown in FIG. 1 as taking place on certain devices, a person of ordinary skill in the art with the benefit of the present disclosure will appreciate that other functional organizations may be utilized depending on the desired implementation. For example, one or more of scanners 106-A, 106-B, samplers 108-A, 108-B, and transformers 112-A and 112-B may be implemented in the network-based authentication service 140 and one or more of databases 118 and comparator 120 may be implemented in a device 102, or 107.

Figure 2:
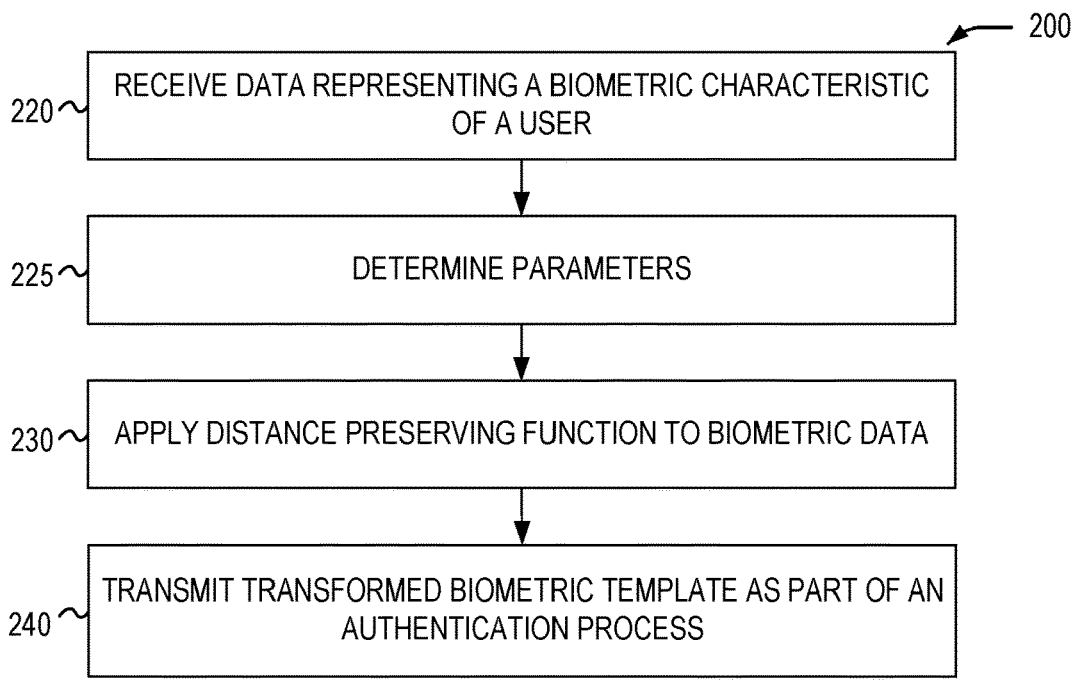
FIG. 2 illustrates a flowchart of a method of applying a distance-preserving function to secure a biometric template according to some examples of the present disclosure.

FIG. 2 illustrates a flowchart of a method 200 of applying a distance-preserving function to secure a biometric template according to some examples of the present disclosure. At operation 220, the computing device may receive one or more data points representing a biometric characteristic of the user. For example, the biometric template produced by the sampler as applied to data captured by the scanning device. At operation 225 the computing device may determine one or more parameters for use in the transformation function. As previously noted, the parameters may be stored locally on the device or retrieved from a network-based authentication service. In other examples, the parameters are determined from a secret input by the user (e.g., password, second biometric, and the like) that is applied to a selection function to select the parameters.

At operation 230, one or more distance-preserving functions are applied to the biometric data utilizing the parameters determined from operation 225. For example, a number of one or more translations, rotations, and/or reflections may be applied to the data. In some examples, the parameters may be, or include a user specific value, such as a random number, a user specified value (e.g., a password), a value in a secure digital certification, a second biometric template of the user, and the like. In other examples, the user specific value may be applied as a transformation to the biometric template prior to the transformation at operation 240 (e.g., the transformation at operation 240 is a second transformation). In some examples, the user specific value is not a representation of a biometric of a user. If the biometric is compromised, the user may change the user-specific value and thus change the transformed biometric to prevent replay attacks.

At operation 240, the protected biometric template may be utilized. For example, by transmitting the protected biometric template to an authentication server of an authentication service that stores it as an exemplar. As another example, the protected biometric template may be utilized by transmitting the protected biometric template to an authentication server of an authentication service that compares it as part of an authentication attempt with a stored exemplar. In still other examples, the protected biometric template may be utilized by the local computing device as it may store the protected biometric template as an exemplar or compare it with a stored exemplar to determine if there is a match.

Figure 3:
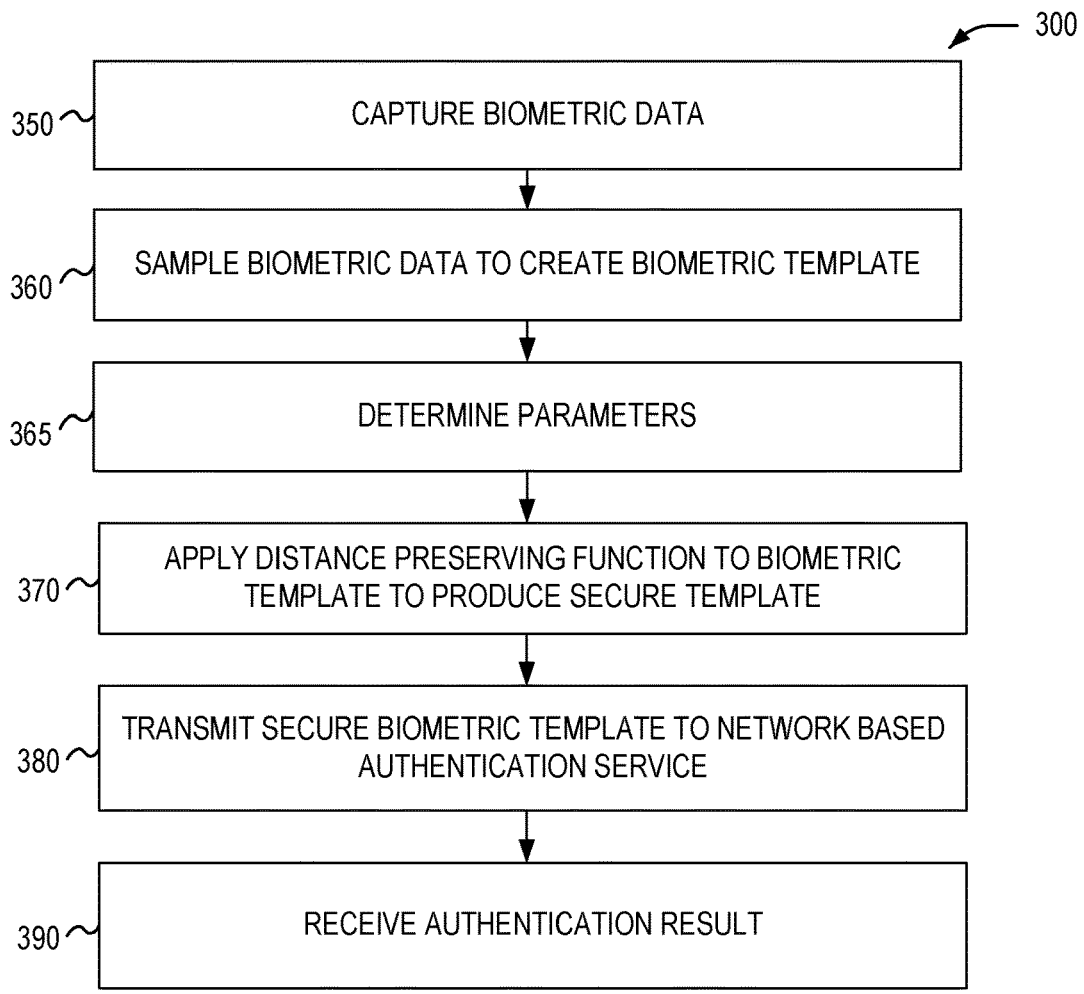
FIG. 3 illustrates a flowchart of a method of applying a distance-preserving function to authenticate with a network-based authentication service according to some examples of the present disclosure.

FIG. 3 illustrates a flowchart of a method 300 of applying a distance-preserving function to authenticate with a network-based authentication service according to some examples of the present disclosure. FIG. 3 is a detailed embodiment of FIG. 2 showing a specific use case of FIG. 2 as part of an authentication attempt. At operation 350 the computing device may capture the biometric data. At operation 360 the biometric data may be sampled to create a biometric template. At operation 365 the system may determine the parameters of the distance-preserving function. The parameters may include the type of distance-preserving function, the degree or magnitude of the transformation, and the like. At operation 370, one or more distance-preserving functions are applied to the biometric template to produce the protected biometric template. At operation 380, the secured template is transmitted to the network-based authentication service as part of a challenge procedure that includes a user identifier and a protected challenge template. In some examples, in addition to the transformation function, the secured biometric template may be additionally encrypted during transmission (e.g., using TLS) or storage for an additional layer of security. At operation 390, the computing device may receive an authentication result. In some examples, the result of the authentication is utilized to provide or deny access to the user to one or more computing resources of the computing device or another computing device. Example computing resources protected by the authentication include access to one or more accounts, access to a computing device, unlocking a computing device, logging into an account of the computing device, obtaining access to one or more files and the like.

Figure 4:
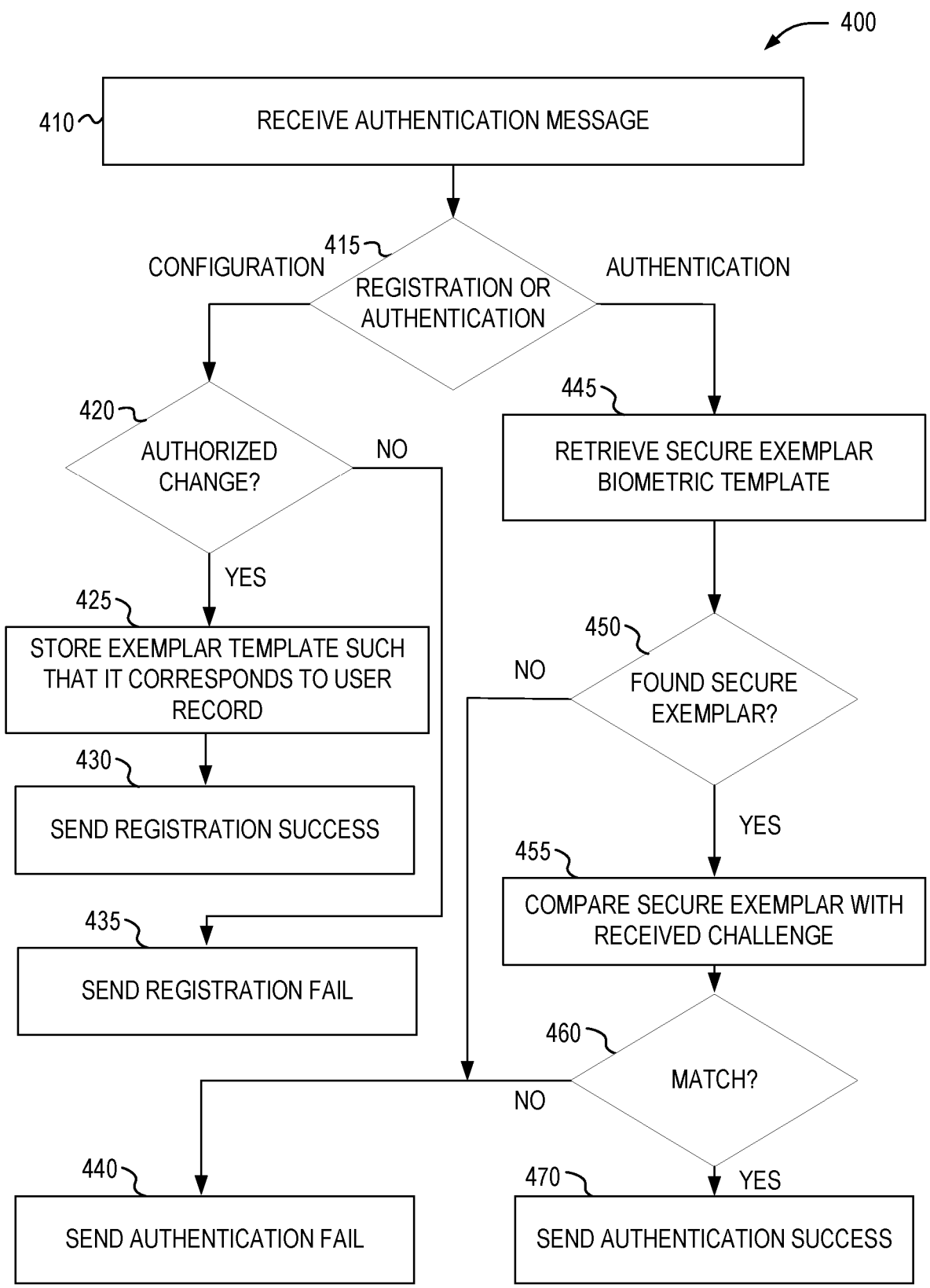
FIG. 4 illustrates a flowchart of a method of an authentication service according to some examples of the present disclosure.

FIG. 4 illustrates a flowchart of a method 400 of an authentication service according to some examples of the present disclosure. At operation 410 a message related to an authentication function is received. For example, from a computing device such as computing device 102 or 107 of FIG. 1. The message may be received over one or more communications networks. Example network types may include one or more packet-based networks, circuit switched networks, and the like. Specific communication network examples include the Internet, a Wide Area Network (WAN), a Local Area Network (LAN), a Plain Old Telephone System (POTS) network, and the like. In other examples, the method steps of FIG. 4 may be performed on the user computing devices themselves and thus the message may be received through inter-process communication techniques, mailboxes, events, function calls, shared memory, and the like.

The message may include one or more of a protected exemplar template (e.g., such as protected exemplar template 116), a protected challenge template (e.g., protected challenge template 130), user identifier, a message type identifying the type of message, and the like. A determination may be made at operation 415 (e.g., using the message type) that evaluates whether the message is a configuration operation or an authentication attempt. Configuration operations include registration of new users, changing the biometric exemplar stored for the user, and the like. Authentication attempts are requests to authenticate a user against a stored exemplar template.

If the message is a configuration message, for registering an exemplar biometric template or replacing an existing biometric template, the system determines if the user is authorized to proceed at operation 420. For example, whether the user is allowed to register with the authorization system, whether the user is authorized to replace their existing biometric exemplar template, and the like. For example, the user may provide a username, password, biometric, user id, or other identifier. The user's credentials may be checked at operation 420 to ensure they are valid. In some examples, new accounts may be created at operation 420. At operation 425, if the user is authorized, the exemplar template may be stored and may be linked to the user's account. At operation 430 a success message may be returned. If the user is not authorized, then at operation 435, the authentication system may return an error.

If at operation 415 the message is requesting authentication of the user, the system may retrieve the secure exemplar biometric template at operation 445. For example, the system may locate a stored user profile of the user that matches a user identification provided in the request message received at operation 410. The secure exemplar biometric template may be retrieved from local storage, from a network-based authentication service (e.g., in examples in which the exemplar biometric template may be stored in the network-based authentication service but the comparison may be done on a local machine), and the like. At operation 450 a check is made to determine whether the secure exemplar was found. If not, then at operation 440 the system may return a failure. If the secure biometric exemplar template was found, then at operation 455 the secure biometric exemplar template may be compared to a template provided in the request message received at operation 410 (e.g., the challenge template). As noted, if the templates match, or are within a threshold distance of each other, the system may determine at operation 460 that they match, and at operation 470 send a success message granting access to one or more computing devices. If the templates do not match, then at operation 440 the system may send a failure message.

Figure 5:
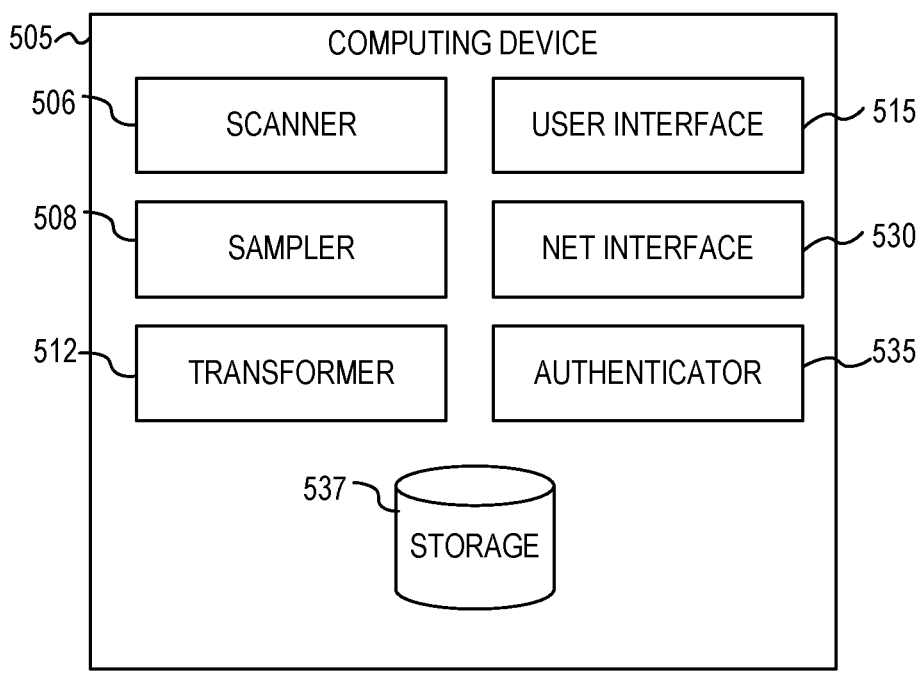
FIG. 5 illustrates a schematic of a user device and a network-based authentication service according to some examples of the present disclosure.
Figure 5:
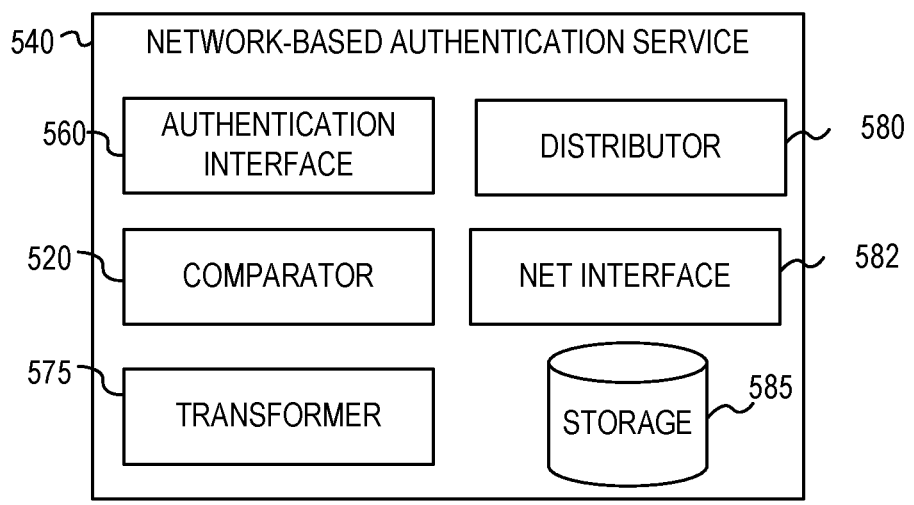

FIG. 5 illustrates a schematic of a user computing device 505 and a network-based authentication service 540 according to some examples of the present disclosure. Components shown in FIG. 5 may be implemented as hardware, software, or a combination of hardware and software. Components of the network-based authentication service 540 may be implemented by one or more computing devices such as server computing devices. As previously described, the computing device 505 and the network-based authentication service 540 may be capable of communication using one or more communication networks, such as the Internet, a WAN, LAN, or the like. Computing device 505 may be an example of computing devices 102, and/or 107 of FIG. 1. Network-based authentication service 540 may be an example of network-based authentication service 140 of FIG. 1. As previously noted some or all of the functionality of computing device 505 may be implemented by network-based authentication service 540 and some or all of the functionality of network-based authentication service 540 may be implemented by computing device 505.

Computing device 505 may include one or more biometric scanners 506, such as a fingerprint sensor, a camera (for facial recognition), an iris scanner, a microphone (for a voice print), and the like. Scanner 506 may be an example of scanner 106-A and/or 106-B of FIG. 1. Scanner 506 may generate a digital representation of one or more biometrics of the user. For example, an image of a person's face, an image of an iris, an image of a fingerprint, and the like. Sampler 508 may be an example of sampler 108-A and 108-B from FIG. 1 and may convert the digital representation of the scanned biometric output by the scanner 506 to a series of one or more points—such as a matrix or vector of values. For example, sampler 508 may detect locations of ridges of a fingerprint; distances between ridges, valleys and other characteristics; locations of facial features; distances between facial features (e.g., distances between a nose and mouth) for facial recognition; voice patterns; patterns in an iris or retina; and the like to produce biometric data called a biometric template.

These templates may be transformed using the transformer 512, which may be an example of transformer 112-A and/or 112-B. For example, the transformer 512 may apply one or more distance-preserving transformations such as translations, rotations, and reflections. The transformed template may be referred to as a protected template and stored in either storage 537 or storage 585. The transformer 512 may utilize one or more function parameters that specify the distance-preserving functions to apply and a magnitude and/or degree of change. Each point in the template may be transformed by the same function and with the same magnitude and/or degree of change. As previously noted, the function parameters may be preselected or predetermined; selected based upon a secret of the user—such as a password or another, different biometric or a different part of a same biometric (e.g., another fingerprint, or another portion of the fingerprint) of the user; as part of a digital certificate or encryption key associated with the user; and the like. In some examples, the transformer 512 and the function parameters may be a matrix multiplication that multiplies the biometric template by a matrix that represents the one or more distance preserving function.

User interface 515 may provide one or more user interfaces to allow the user to enter or present their biometric and to authenticate. User interface 515 may also present the one or more computer resources that are access restricted by the biometric authentication that is, upon authentication the user interface 515 may present one or more user interface of one or more computer resources that were previously inaccessible to the user prior to authentication. Network interface 530 may provide one or more network interfaces and functionality for communicating using a communication network. Examples include providing communication protocols such as described by an IEEE 802.11 standard, an Ethernet standard, an Internet Protocol (IP) standard, a Transmission Control Protocol (TCP) standard, and the like. In addition, the network interface 530 may be configured to implement a protocol to communicate with the network-based authentication service through a defined protocol (e.g., a Representational state transfer (REST) protocol).

Authenticator 535 may, in conjunction with the user interface 515, scanner 506, sampler 508, transformer 512, storage 537, and network interface 530 create user interfaces, accept user input, and otherwise provide for a user to register a biometric exemplar, secure the biometric exemplar using the distance-preserving function, attempt to later authenticate using a biometric, send the biometric template transformed with the distance-preserving function to a network-based authentication service (for storage or comparison) or store the transformed biometric template locally and do the authentication (comparison) locally. In some examples, function parameters (e.g., parameter sets) may be stored in storage 537.

Network-based authentication service 540 may be an example of network-based authentication service 140 of FIG. 1. Comparator 520 compares two protected biometric templates, such as an exemplar biometric template and a challenge biometric template and determines whether they are close enough to constitute a match. For example, if they match within a predetermined level of similarity (e.g., distance).

Authentication interface 560 may interface with user computing device 505 and other computing devices to authenticate the user of the computing device 505. For example, a third-party computing device may seek to authenticate a user through the use of biometrics. The third-party computing device may contact the authentication interface 560 to authenticate the user. The authentication interface 560 then requests that the user authenticate by sending an authentication request to the computing device 505. The computing device 505 then collects the biometric, transforms the template, and sends it to the authentication interface 560. Authentication interface 560 then passes the received protected biometric template to the comparator 520. The authentication interface 560 then passes the result produced by the comparator 520 back to the third-party requestor. In other examples, the protected computing resources may be on the computing device 505. For example, the user of computing device 505 may attempt to access a protected resource on the computing device 505 (e.g., login to the device, unlock the device, access certain files and/or directories, and the like). The computing device 505 may contact the authentication interface 560 of the network-based authentication service 540 to authenticate the user. The result of the authentication may be sent back to the computing device 505, which may allow the user (depending on the result) to access the protected resource. A protected resource is any computer data (e.g., file, message, program), functionality, or access that is restricted to particular users and for which a user must authenticate to access.

In some examples, the network-based authentication service may include a transformer 575. For example, the function parameters may be stored in the network-based authentication service 540. In some examples, the computing device 505 sends the unprotected challenge template to the network-based authentication service, which then transforms it for comparison with the protected exemplar. In other examples distributor 580 may manage distribution of the functional parameters to one or more devices, such as computing device 505.

Network interface 582 may provide one or more network interfaces and functionality for communicating using a communication network. Examples include providing communication protocols such as described by an IEEE 802.11 standard, an Ethernet standard, an Internet Protocol (IP) standard, a Transmission Control Protocol (TCP) standard, and the like. In addition, the network interface 582 may be configured to implement a protocol to communicate with the computing device 505 through a defined protocol (e.g., a Representational state transfer (REST) protocol). Storage 585 may store protected exemplars, function parameters, user identifiers and/or profiles, and the like.

While the disclosed embodiments focused on securing biometrics, the present disclosed use of distance preserving functions may be applicable to other types of information and data. For example, one or more distance preserving functions may be applied to other types of sensitive information such as other credentials of a user (such as usernames and/or passwords), user health data (e.g., for government requirements), social security numbers, government identification numbers, financial information, transaction information, bank account information, and the like as described herein for biometric data. The information as transformed by one or more distance preserving functions may be stored in a network-based storage and then accessed later without fear of having the information stolen. As noted above, any subsequent comparison of that information with other information may look for not only a direct match, but allow for a degree of tolerance for differences.

Other example usages may include transforming a document using a distance preserving function. This exemplar document may be later compared with a challenge document (in a same way as was done with the biometric template) to see if they match or are similar. The documents may be protected from disclosure by the distance preserving function. Other examples, may include transforming a watermark, a cryptographic key, or the like.

Figure 6:
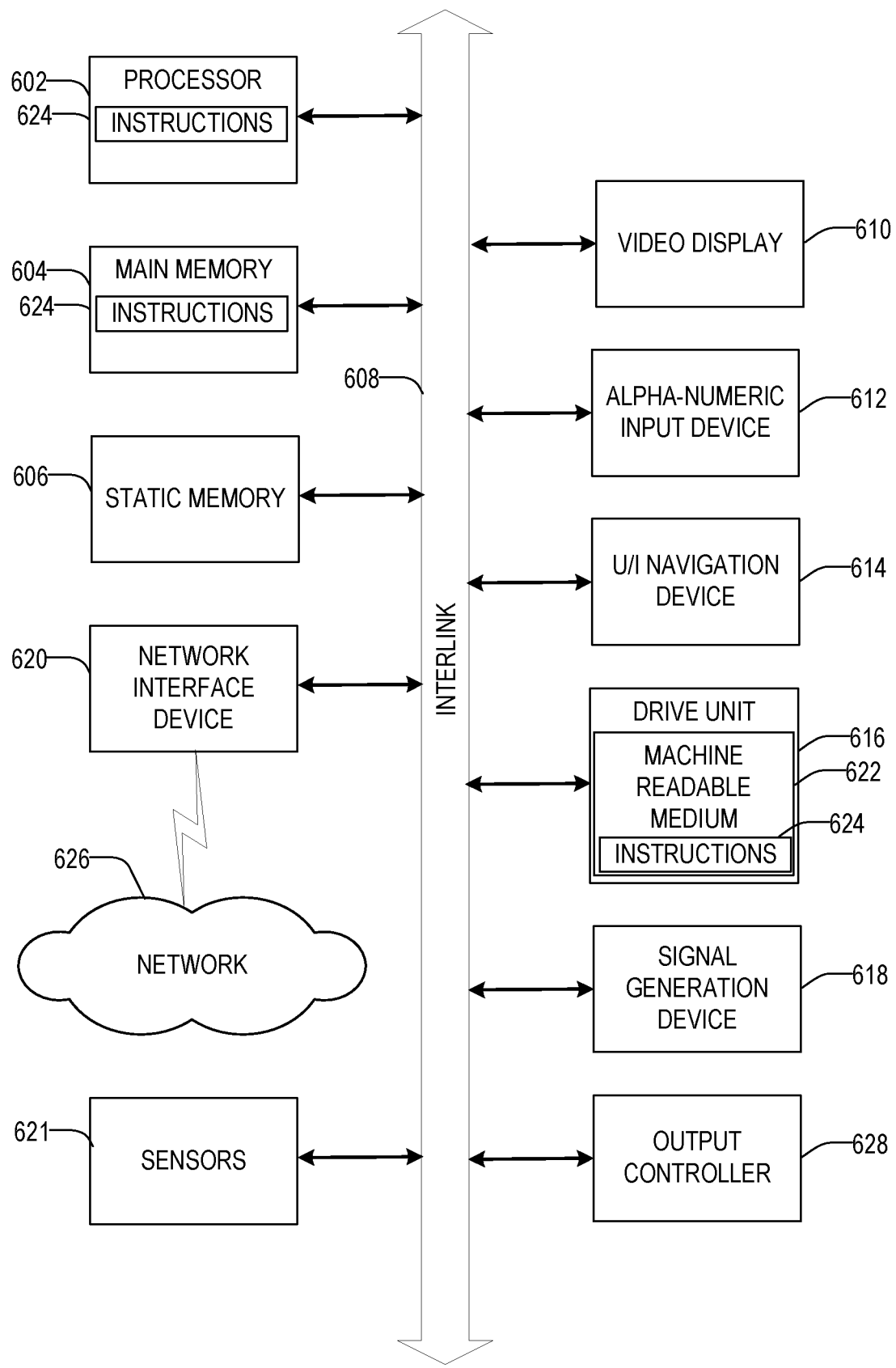
FIG. 6 is a block diagram illustrating an example of a machine upon which one or more embodiments may be implemented.

FIG. 6 illustrates a block diagram of an example machine 600 upon which any one or more of the techniques (e.g., methodologies) discussed herein may be implemented. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a server of a network-based authentication service, a user device, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. One or more machines 600 may implement the system 100, network-based authentication service 540, computing device 505, and be configured to perform the methods of FIGS. 2-4. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms ("modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NEC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically. Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is non-transitory, such as, not a transitory propagating signal.

The instructions 624 may further be transmitted or received over a communications network 626 using a transmission medium via the network interface device 620. The Machine 600 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN) a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UNFITS) family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MEMO techniques.

Other Notes and Examples

Example 1 is a method for securing biometric data used in authentication of a user of a computing device, the method comprising: using one or more hardware processors: receiving a first set of data points representing a biometric characteristic of the user; determining a function parameter set for a distance-preserving transformation; transforming the received first set of data points to a second set of data points using the distance-preserving transformation and the function parameter set; and invoking an authentication operation for the user by transmitting the second set of data points to a network-based authentication service over a communications network.

In Example 2, the subject matter of Example 1 includes, wherein the authentication operation is a registration operation that causes the network-based authentication service to store the second set of data points in association with an identifier of the user.

In Example 3, the subject matter of Examples 1-2 includes, wherein the authentication operation is an authentication request and wherein the method further comprises: receiving a notification that the second set of data points matches a stored set of data points stored at the network-based authentication service; and providing access to the user to a resource provided by the one or more hardware processors based upon the notification.

In Example 4, the subject matter of Examples 1-3 includes, wherein the authentication operation is an authentication request and wherein the method further comprises: receiving a notification that the second set of data points does not match a stored set of data points on the network-based authentication service; and denying access to a resource provided by the one or more hardware processors based upon the notification.

In Example 5, the subject matter of Examples 1-4 includes, wherein the distance-preserving transformation comprises one or more of: a rotation, a translation; or a reflection of the first set of data points.

In Example 6, the subject matter of Example 5 includes, wherein the function parameter set comprises one or more of: a degree of rotation, a magnitude of translation, or a number of reflections.

In Example 7, the subject matter of Example 6 includes, wherein the method further comprises selecting the function parameter set based upon a third set of data points describing a digitized representation of a second biometric characteristic of the user.

In Example 8, the subject matter of Examples 6-7 includes, wherein the method further comprises determining the function parameter set based upon a secret value corresponding to the user.

In Example 9, the subject matter of Example 8 includes, wherein the secret value does not correspond to a representation of a biometric of the user.

In Example 10, the subject matter of Examples 8-9 includes, wherein the secret value is contained in a user specific digital certificate.

In Example 11, the subject matter of Examples 8-10 includes, wherein transforming the received first set of data points to the second set of data points comprises utilizing a user specific value and the distance-preserving transformation to transform the received set of data points to the second set of data points.

In Example 12, the subject matter of Example 11 includes, wherein the method further comprises: receiving an indication that the second set of data points was compromised, and in response: selecting a second user specific value; receiving a third set of data points describing a digitized representation of the biometric characteristic of the user; transforming the received third set of data points to a fourth set of data points using the distance-preserving transformation and the second user specific value; and transmitting the fourth set of data points to the network-based authentication service over the communications network.

In Example 13, the subject matter of Examples 1-12 includes, wherein the biometric characteristic comprises one of: fingerprint data, iris data, facial recognition data, voice print data, or physiological data.

Example 14 is a machine-readable medium, comprising instructions for securing biometric data used in authentication of a user of a computing device; the instructions, when executed, causing a machine to perform operations comprising: receiving a first set of data points representing a biometric characteristic of the user; determining a function parameter set for a distance-preserving transformation; transforming the received first set of data points to a second set of data points using the distance-preserving transformation and the function parameter set; and invoking an authentication operation for the user by transmitting the second set of data points to a network-based authentication service over a communications network.

In Example 15, the subject matter of Example 14 includes, wherein the authentication operation is a registration operation that causes the network-based authentication service to store the second set of data points in association with an identifier of the user.

In Example 16, the subject matter of Examples 14-15 includes, wherein the authentication operation is an authentication request and wherein the operations further comprise: receiving a notification that the second set of data points matches a stored set of data points stored at the network-based authentication service; and providing access to the user to a resource provided by the one or more hardware processors based upon the notification.

In Example 17, the subject matter of Examples 14-16 includes, wherein the authentication operation is an authentication request and wherein the operations further comprise: receiving a notification that the second set of data points does not match a stored set of data points on the network-based authentication service; and denying access to a resource provided by the one or more hardware processors based upon the notification.

In Example 18, the subject matter of Examples 14-17 includes, wherein the distance-preserving transformation comprises one or more of: a rotation, a translation, or a reflection of the first set of data points.

In Example 19, the subject matter of Example 18 includes, wherein the function parameter set comprises one or more of: a degree of rotation, a magnitude of translation, or a number of reflections.

In Example 20, the subject matter of Example 19 includes, wherein the operations further comprise selecting the function parameter set based upon a third set of data points describing a digitized representation of a second biometric characteristic of the user.

In Example 21, the subject matter of Examples 19-20 includes, wherein the operations further comprise determining the function parameter set based upon a secret value corresponding to the user.

In Example 22, the subject matter of Example 21 includes, wherein the secret value does not correspond to a representation of a biometric of the user.

In Example 23, the subject matter of Examples 21-22 includes, wherein the secret value is contained in a user specific digital certificate.

In Example 24, the subject matter of Examples 21-23 includes, wherein the operations of transforming the received first set of data points to the second set of data points comprise utilizing a user specific value and the distance-preserving transformation to transform the received set of data points to the second set of data points.

In Example 25, the subject matter of Example 24 includes, wherein the operations further comprise: receiving an indication that the second set of data points was compromised, and in response: selecting a second user specific value; receiving a third set of data points describing a digitized representation of the biometric characteristic of the user; transforming the received third set of data points to a fourth set of data points using the distance-preserving transformation and the second user specific value; and transmitting the fourth set of data points to the network-based authentication service over the communications network.

In Example 26, the subject matter of Examples 14-25 includes, wherein the biometric characteristic comprises one of: fingerprint data, iris data, facial recognition data, voice print data, or physiological data.

Example 27 is a computing device for securing biometric data used in an authentication; the computing device comprising: a processor; a memory, comprising instructions, which when performed by the processor, cause the processor to perform operations comprising: receiving a first set of data points representing a biometric characteristic of the user; determining a function parameter set for a distance-preserving transformation; transforming the received first set of data points to a second set of data points using the distance-preserving transformation and the function parameter set; and invoking an authentication operation for the user by transmitting the second set of data points to a network-based authentication service over a communications network.

In Example 28, the subject matter of Example 27 includes; wherein the authentication operation is a registration operation that causes the network-based authentication service to store the second set of data points in association with an identifier of the user.

In Example 29, the subject matter of Examples 27-28 includes, wherein the authentication operation is an authentication request and wherein the operations further comprise: receiving a notification that the second set of data points matches a stored set of data points stored at the network-based authentication service; and providing access to the user to a resource provided by the one or more hardware processors based upon the notification.

In Example 30, the subject matter of Examples 27-29 includes, wherein the authentication operation is an authentication request and wherein the operations further comprise: receiving a notification that the second set of data points does not match a stored set of data points on the network-based authentication service; and denying access to a resource provided by the one or more hardware processors based upon the notification.

In Example 31; the subject matter of Examples 27-30 includes, wherein the distance-preserving transformation comprises one or more of: a rotation, a translation; or a reflection of the first set of data points.

In Example 32, the subject matter of Example 31 includes, wherein the function parameter set comprises one or more of: a degree of rotation, a magnitude of translation, or a number of reflections.

In Example 33, the subject matter of Example 32 includes, wherein the operations further comprise selecting the function parameter set based upon a third set of data points describing a digitized representation of a second biometric characteristic of the user.

In Example 34, the subject matter of Examples 32-33 includes, wherein the operations further comprise determining the function parameter set based upon a secret value corresponding to the user.

In Example 35, the subject matter of Example 34 includes, wherein the secret value does not correspond to a representation of a biometric of the user.

In Example 36, the subject matter of Examples 34-35 includes, wherein the secret value is contained in a user specific digital certificate.

In Example 37, the subject matter of Examples 34-36 includes, wherein the operations of transforming the received first set of data points to the second set of data points comprise utilizing a user specific value and the distance-preserving transformation to transform the received set of data points to the second set of data points.

In Example 38, the subject matter of Example 37 includes, wherein the operations further comprise: receiving an indication that the second set of data points was compromised, and in response: selecting a second user specific value; receiving a third set of data points describing a digitized representation of the biometric characteristic of the user; transforming the received third set of data points to a fourth set of data points using the distance-preserving transformation and the second user specific value; and transmitting the fourth set of data points to the network-based authentication service over the communications network.

In Example 39, the subject matter of Examples 27-38 includes, wherein the biometric characteristic comprises one of: fingerprint data, iris data, facial recognition data, voice print data, or physiological data.

Example 40 is a device for securing biometric data used in authentication of a user, the device comprising: means for receiving a first set of data points representing a biometric characteristic of the user; means for determining a function parameter set for a distance-preserving transformation; means for transforming the received first set of data points to a second set of data points using the distance-preserving transformation and the function parameter set; and means for invoking an authentication operation for the user by transmitting the second set of data points to a network-based authentication service over a communications network.

In Example 41, the subject matter of Example 40 includes, wherein the authentication operation is a registration operation that causes the network-based authentication service to store the second set of data points in association with an identifier of the user.

In Example 42, the subject matter of Examples 40-41 includes, wherein the authentication operation is an authentication request and wherein the device further comprises: means for receiving a notification that the second set of data points matches a stored set of data points stored at the network-based authentication service; and means for providing access to the user to a resource provided by the one or more hardware processors based upon the notification.

In Example 43, the subject matter of Examples 40-42 includes, wherein the authentication operation is an authentication request and wherein the device further comprises: means for receiving a notification that the second set of data points does not match a stored set of data points on the network-based authentication service; and means for denying access to a resource provided by the one or more hardware processors based upon the notification.

In Example 44, the subject matter of Examples 40-43 includes, wherein the distance-preserving transformation comprises one or more of: a rotation, a translation, or a reflection of the first set of data points.

In Example 45, the subject matter of Example 44 includes, wherein the function parameter set comprises one or more of: a degree of rotation, a magnitude of translation, or a number of reflections.

In Example 46, the subject matter of Example 45 includes, wherein the device further comprises means for selecting the function parameter set based upon a third set of data points describing a digitized representation of a second biometric characteristic of the user.

In Example 47, the subject matter of Examples 45-46 includes, wherein the device further comprises means for determining the function parameter set based upon a secret value corresponding to the user.

In Example 48, the subject matter of Example 47 includes, wherein the secret value does not correspond to a representation of a biometric of the user.

In Example 49, the subject matter of Examples 47-48 includes, wherein the secret value is contained in a user specific digital certificate.

In Example 50, the subject matter of Examples 47-49 includes, wherein the means for transforming the received first set of data points to the second set of data points comprises means for utilizing a user specific value and the distance-preserving transformation to transform the received set of data points to the second set of data points.

In Example 51, the subject matter of Example 50 includes, wherein the device further comprises: means for receiving an indication that the second set of data points was compromised, and in response: means for selecting a second user specific value; means for receiving a third set of data points describing a digitized representation of the biometric characteristic of the user; means for transforming the received third set of data points to a fourth set of data points using the distance-preserving transformation and the second user specific value; and means for transmitting the fourth set of data points to the network-based authentication service over the communications network.

In Example 52, the subject matter of Examples 40-51 includes, wherein the biometric characteristic comprises one of: fingerprint data, iris data, facial recognition data, voice print data, or physiological data.

Example 53 is a method for securing sensitive data in a network-based service, the method comprising: using one or more hardware processors: receiving an input data item over a network; determining a function parameter set for a distance-preserving transformation; transforming the received input data item to an output data item using the distance-preserving transformation and the function parameter set; and storing the output data item in a storage device of the network-based service.

In Example 54, the subject matter of Example 53 includes, wherein the method further comprises: receiving an authentication request including a third data item; determining that the third data item and the output data item match within a predetermined threshold; and causing access to be granted to a user to a computing resource.

In Example 55, the subject matter of Examples 53-54 includes, wherein the method further comprises: receiving an authentication request including a third data item; determining that the third data item and the output data item do not match within a predetermined threshold; and causing access to be denied to a user to a computing resource.

In Example 56, the subject matter of Examples 53-55 includes, wherein the input data item comprises one of: an authentication credential; an encryption key; or a watermark.

In Example 57, the subject matter of Examples 53-56 includes, wherein the distance-preserving transformation comprises one or more of: a rotation, a translation, or a reflection of the first data item.

In Example 58, the subject matter of Example 57 includes, wherein the function parameter set comprises one or more of: a degree of rotation, a magnitude of translation, or a number of reflections.

In Example 59, the subject matter of Example 58 includes; wherein the method further comprises determining the function parameter set based upon a secret value corresponding to a user.

In Example 60, the subject matter of Example 59 includes, wherein the secret value does not correspond to a representation of a biometric of the user.

In Example 61, the subject matter of Examples 59-60 includes, wherein the secret value is contained in a user specific digital certificate.

In Example 62, the subject matter of Examples 59-61 includes, wherein the method further comprises: receiving an indication that the output data item was accessed by an unauthorized party, and in response: selecting a second user specific value; receiving a third data item; transforming the third data item to a fourth data item using the distance-preserving transformation and the second user specific value; and replacing the output data item in the storage device of the network-based service with the third data item.

Example 63 is a machine-readable medium for securing sensitive data in a network-based service, the machine-readable medium comprising instructions, which when executed by a machine, cause the machine to perform operations comprising: receiving an input data item over a network; determining a function parameter set for a distance-preserving transformation; transforming the received input data item to an output data item using the distance-preserving transformation and the function parameter set; and storing the output data item in a storage device of the network-based service.

In Example 64, the subject matter of Example 63 includes, wherein the operations further comprise: receiving an authentication request including a third data item; determining that the third data item and the output data item match within a predetermined threshold; and causing access to be granted to a user to a computing resource.

In Example 65, the subject matter of Examples 63-64 includes, wherein the operations further comprise: receiving an authentication request including a third data item; determining that the third data item and the output data item do not match within a predetermined threshold; and causing access to be denied to a user to a computing resource.

In Example 66, the subject matter of Examples 63-65 includes, wherein the input data item comprises one of: an authentication credential; an encryption key; or a watermark.

In Example 67, the subject matter of Examples 63-66 includes, wherein the distance-preserving transformation comprises one or more of: a rotation, a translation, or a reflection of the first data item.

In Example 68, the subject matter of Example 67 includes, wherein the function parameter set comprises one or more of: a degree of rotation, a magnitude of translation, or a number of reflections.

In Example 69, the subject matter of Example 68 includes, wherein the operations further comprise: determining the function parameter set based upon a secret value corresponding to a user.

In Example 70, the subject matter of Example 69 includes, wherein the secret value does not correspond to a representation of a biometric of the user.

In Example 71, the subject matter of Examples 69-70 includes, wherein the secret value is contained in a user specific digital certificate.

In Example 72, the subject matter of Examples 69-71 includes, wherein the operations further comprise: receiving an indication that the output data item was accessed by an unauthorized party, and in response: selecting a second user specific value; receiving a third data item; transforming the third data item to a fourth data item using the distance-preserving transformation and the second user specific value; and replacing the output data item in the storage device of the network-based service with the third data item.

Example 73 is a computing device for securing sensitive data in a network-based service, the computing device comprising: a processor; and a memory storing instructions, which when performed by the processor, cause the processor to perform operations comprising: receiving an input data item over a network; determining a function parameter set for a distance-preserving transformation; transforming the received input data item to an output data item using the distance-preserving transformation and the function parameter set; and storing the output data item in a storage device of the network-based service.

In Example 74, the subject matter of Example 73 includes, wherein the operations further comprise: receiving an authentication request including a third data item; determining that the third data item and the output data item match within a predetermined threshold; and causing access to be granted to a user to a computing resource.

In Example 75, the subject matter of Examples 73-74 includes, wherein the operations further comprise: receiving an authentication request including a third data item; determining that the third data item and the output data item do not match within a predetermined threshold; and causing access to be denied to a user to a computing resource.

In Example 76, the subject matter of Examples 73-75 includes, wherein the input data item comprises one of: an authentication credential; an encryption key; or a watermark.

In Example 77, the subject matter of Examples 73-76 includes, wherein the distance-preserving transformation comprises one or more of: a rotation, a translation, or a reflection of the first data item.

In Example 78, the subject matter of Example 77 includes, wherein the function parameter set comprises one or more of: a degree of rotation, a magnitude of translation, or a number of reflections.

In Example 79, the subject matter of Example 78 includes, wherein the operations further comprise: determining the function parameter set based upon a secret value corresponding to a user.

In Example 80, the subject matter of Example 79 includes, wherein the secret value does not correspond to a representation of a biometric of the user.

In Example 81, the subject matter of Examples 79-80 includes, wherein the secret value is contained in a user specific digital certificate.

In Example 82, the subject matter of Examples 79-81 includes, wherein the operations further comprise: receiving an indication that the output data item was accessed by an unauthorized party, and in response: selecting a second user specific value; receiving a third data item; transforming the third data item to a fourth data item using the distance-preserving transformation and the second user specific value; and replacing the output data item in the storage device of the network-based service with the third data item.

Example 83 is a device for securing sensitive data in a network-based service, the device comprising: means for receiving an input data item over a network; means for determining a function parameter set for a distance-preserving transformation; means for transforming the received input data item to an output data item using the distance-preserving transformation and the function parameter set; and means for storing the output data item in a storage device of the network-based service.

In Example 84, the subject matter of Example 83 includes, wherein the device further comprises: means for receiving an authentication request including a third data item; means for determining that the third data item and the output data item match within a predetermined threshold; and means for causing access to be granted to a user to a computing resource.

In Example 85, the subject matter of Examples 83-84 includes, wherein the device further comprises: means for receiving an authentication request including a third data item; means for determining that the third data item and the output data item do not match within a predetermined threshold; and means for causing access to be denied to a user to a computing resource.

In Example 86, the subject matter of Examples 83-85 includes, wherein the input data item comprises one of: an authentication credential; an encryption key; or a watermark.

In Example 87, the subject matter of Examples 83-86 includes, wherein the distance-preserving transformation comprises one or more of: a rotation, a translation, or a reflection of the first data item.

In Example 88, the subject matter of Example 87 includes, wherein the function parameter set comprises one or more of: a degree of rotation, a magnitude of translation, or a number of reflections.

In Example 89, the subject matter of Example 88 includes, wherein the device further comprises means for determining the function parameter set based upon a secret value corresponding to a user.

In Example 90, the subject matter of Example 89 includes, wherein the secret value does not correspond to a representation of a biometric of the user.

In Example 91, the subject matter of Examples 89-90 includes, wherein the secret value is contained in a user specific digital certificate.

In Example 92, the subject matter of Examples 89-91 includes, wherein the device further comprises: means for receiving an indication that the output data item was accessed by an unauthorized party, and in response: means for selecting a second user specific value; means for receiving a third data item; means for transforming the third data item to a fourth data item using the distance-preserving transformation and the second user specific value; and means for replacing the output data item in the storage device of the network-based service with the third data item.

Example 93 is at least one machine-readable medium including instructions that, when executed by processing circuitry, cause the processing circuitry to perform operations to implement of any of Examples 1-92.

Example 94 is an apparatus comprising means to implement of any of Examples 1-92.

Example 95 is a system to implement of any of Examples 1-92.

Example 96 is a method to implement of any of Examples 1-92.

What is claimed is:

1. A computing device for securing biometric data used in an authentication, the computing device comprising:
a processor;
a memory, comprising instructions, which when performed by the processor, cause the processor to perform operations comprising:
receiving a first set of data points representing a biometric characteristic of a user;
determining a function parameter set for a distance-preserving transformation;
transforming the received first set of data points to a second set of data points using the distance-preserving transformation and the function parameter set, the distance-preserving transformation mapping the first set of data points to the second set of data points in a new metric space, wherein distances between respective data points of the first set of data points are unchanged in the second set of data points; and
invoking an authentication operation for the user by transmitting the second set of data points to a network-based authentication service over a communications network, the authentication operation causing storage of the second set of data points or a comparison of the second set of data points to a stored value to produce an authentication result.

2. The computing device of claim 1, wherein the authentication operation is a registration operation that causes the network-based authentication service to store the second set of data points in association with an identifier of the user.

3. The computing device of claim 1, wherein the authentication operation is an authentication request and wherein the operations further comprise:
   receiving a notification that the second set of data points matches a stored set of data points stored at the network-based authentication service; and
   providing access to the user to a resource provided by the processor based upon the notification.

4. The computing device of claim 1, wherein the distance-preserving transformation comprises one or more of: a rotation, a translation, or a reflection of the first set of data points.

5. The computing device of claim 4, wherein the function parameter set comprises one or more of: a degree of rotation, a magnitude of translation, or a number of reflections.

6. The computing device of claim 1, wherein the biometric characteristic comprises one of: fingerprint data, iris data, facial recognition data, voice print data, or physiological data.

7. A method for securing biometric data used in authentication of a user of a computing device, the method comprising:
   using one or more hardware processors:
      receiving a first set of data points representing a biometric characteristic of the user;
      determining a function parameter set for a distance-preserving transformation;
      transforming the received first set of data points to a second set of data points using the distance-preserving transformation and the function parameter set, the distance-preserving transformation mapping the first set of data points to the second set of data points in a new metric space, wherein distances between respective data points of the first set of data points are unchanged in the second set of data points; and
      invoking an authentication operation for the user by transmitting the second set of data points to a network-based authentication service over a communications network, the authentication operation causing storage of the second set of data points or a comparison of the second set of data points to a stored value to produce an authentication result.

8. The method of claim 7, wherein the authentication operation is a registration operation that causes the network-based authentication service to store the second set of data points in association with an identifier of the user.

9. The method of claim 7, wherein the authentication operation is an authentication request and wherein the method further comprises:
   receiving a notification that the second set of data points does not match a stored set of data points on the network-based authentication service; and
   denying access to a resource provided by the one or more hardware processors based upon the notification.

10. The method of claim 7, wherein the distance-preserving transformation comprises one or more of: a rotation, a translation, or a reflection of the first set of data points.

11. The method of claim 10, wherein the function parameter set comprises one or more of: a degree of rotation, a magnitude of translation, or a number of reflections.

12. The method of claim 11, wherein the method further comprises determining the function parameter set based upon a secret value corresponding to the user.

13. The method of claim 12, wherein the secret value does not correspond to a representation of a biometric of the user.

14. The method of claim 12, wherein transforming the received first set of data points to the second set of data points comprises utilizing a user specific value and the distance-preserving transformation to transform the received set of data points to the second set of data points.

15. The method of claim 14, wherein the method further comprises:
   receiving an indication that the second set of data points was compromised, and in response:
      selecting a second user specific value;
      receiving a third set of data points describing a digitized representation of the biometric characteristic of the user;
      transforming the received third set of data points to a fourth set of data points using the distance-preserving transformation and the second user specific value; and
      transmitting the fourth set of data points to the network-based authentication service over the communications network.

16. A device for securing biometric data used in authentication of a user, the device comprising:
   means for receiving a first set of data points representing a biometric characteristic of the user;
   means for determining a function parameter set for a distance-preserving transformation;
   means for transforming the received first set of data points to a second set of data points using the distance-preserving transformation and the function parameter set, the distance-preserving transformation mapping the first set of data points to the second set of data points in a new metric space, wherein distances between respective data points of the first set of data points are unchanged in the second set of data points; and
   means for invoking an authentication operation for the user by transmitting the second set of data points to a network-based authentication service over a communications network, the authentication operation causing storage of the second set of data points or a comparison of the second set of data points to a stored value to produce an authentication result.

17. The device of claim 16, wherein the authentication operation is a registration operation that causes the network-based authentication service to store the second set of data points in association with an identifier of the user.

18. The device of claim 16, wherein the distance-preserving transformation comprises one or more of: a rotation, a translation, or a reflection of the first set of data points.

19. The device of claim 18, wherein the function parameter set comprises one or more of: a degree of rotation, a magnitude of translation, or a number of reflections.

20. The device of claim 16, wherein the biometric characteristic comprises one of: fingerprint data, iris data, facial recognition data, voice print data, or physiological data.

* * * * *